United States Patent [19]
Tummino et al.

[11] Patent Number: 5,401,071
[45] Date of Patent: Mar. 28, 1995

[54] PITCH FORK

[76] Inventors: Giuseppe A. Tummino, 215 Walnut Ave., Revere, Mass. 02151; George Spector, 233 Broadway Rm 702, New York, N.Y. 10279

[21] Appl. No.: 236,177
[22] Filed: May 2, 1994
[51] Int. Cl.⁶ .................................. A01D 9/02
[52] U.S. Cl. .......................... 294/55.5; 294/60
[58] Field of Search ............ 294/49, 50, 50.6, 55, 294/55.5, 59, 60; 172/371, 378, 380; 254/131.5

[56] References Cited

U.S. PATENT DOCUMENTS

| | | | |
|---|---|---|---|
| 493,110 | 3/1893 | Orthwein | 294/60 |
| 1,018,424 | 2/1912 | Jewett | 294/60 |
| 1,119,605 | 12/1914 | Hunt | 294/60 |
| 1,331,495 | 2/1920 | Gibson | 294/60 |
| 1,335,848 | 4/1920 | Miller | 294/60 |
| 1,513,179 | 10/1924 | Monica | 294/60 |
| 1,952,585 | 3/1934 | Croasdale et al. | 294/60 X |
| 3,226,149 | 12/1965 | McJohnson | 294/55.5 X |
| 5,033,782 | 7/1991 | Hirzel | 294/55.5 |

FOREIGN PATENT DOCUMENTS

| | | | |
|---|---|---|---|
| 161303 | 2/1955 | Australia | 294/60 |
| 13293 | 5/1910 | Denmark | 294/60 |
| 120185 | 11/1947 | Sweden | 294/60 |

Primary Examiner—Johnny D. Cherry

[57] ABSTRACT

An improved pitchfork is provided which consists of a fork head, with a ferrule extending from an upper end of the fork head. An elongated handle has a first end engaging the ferrule. A hand grip engages a second end of the elongated handle. A structure on the upper end of the fork end is for increasing a support area for a foot of a person, to facilitate a better insertion of the fork head into the soil and other material which it is desired to handle.

1 Claim, 1 Drawing Sheet

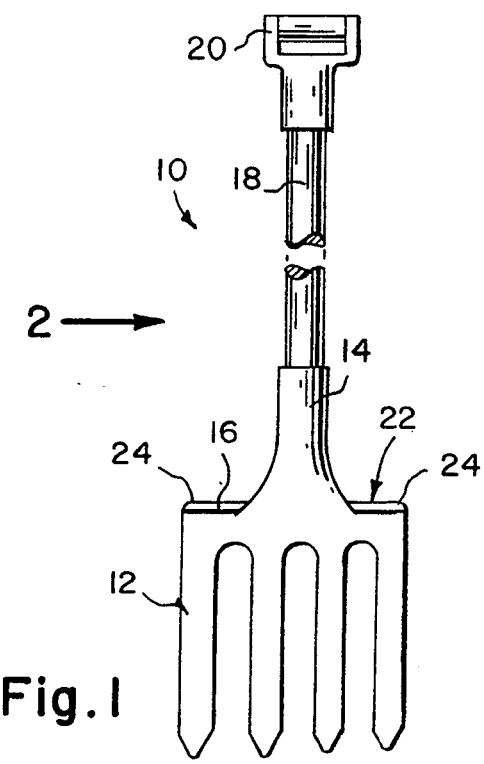
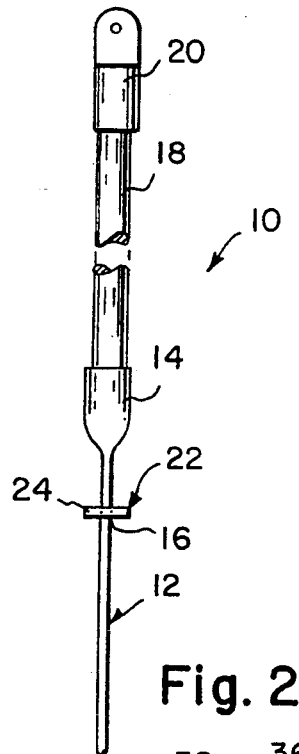
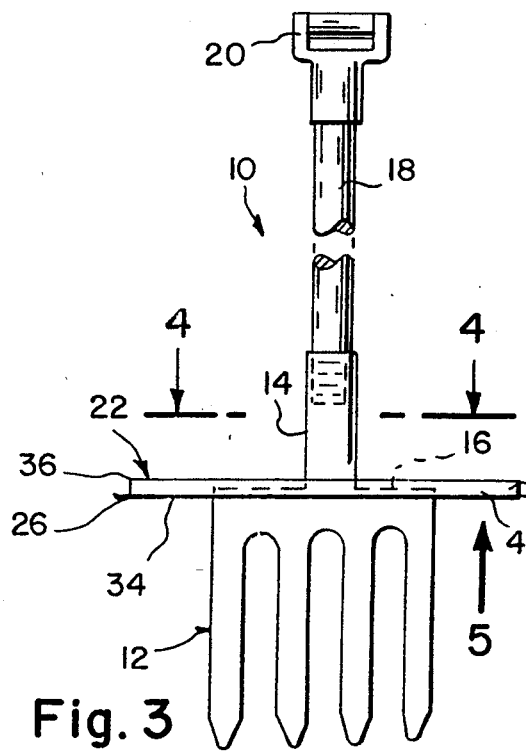
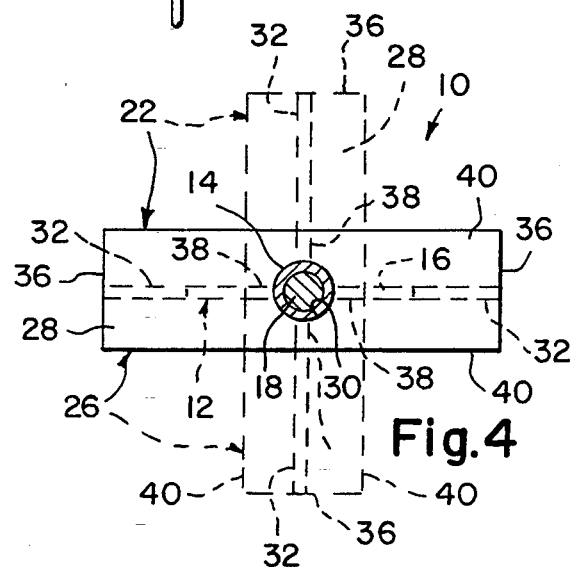
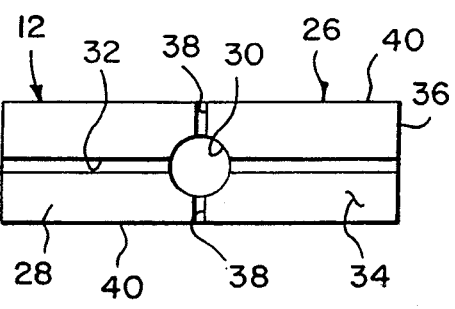

PITCH FORK

BACKGROUND OF THE INVENTION

The instant invention relates generally to garden implements and more specifically it relates to an improved pitchfork, which provides a foot rest for facilitating the better insertion of the fork into the soil.

There are available various conventional garden implements which do not provide the novel improvements of the invention herein disclosed.

SUMMARY OF THE INVENTION

A primary object of the present invention is to provide an improved pitchfork that will overcome the shortcomings of the prior art devices.

Another object is to provide an improved pitchfork that contains a built-in footrest thereon for facilitating the better insertion of a fork head into the soil or other material which it is desired to handle.

An additional object is to provide an improved pitchfork in which the footrest is a separable plate, so that it can be placed in two different positions upon the back edge of the fork head to increse the area of applied foot pressure thereto.

A further object is to provide an improved pitchfork that is simple and easy to use.

A still further object is to provide an improved pitchfork that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front view of a first embodiment of the instant invention.

FIG. 2 is a side view taken in the direction of arrow 2 in FIG. 1.

FIG. 3 is a front view of a second embodiment of the instant invention being an adjustable footrest plate.

FIG. 4 is a cross sectional view taken along line 4—4 in FIG. 3, showing the two positions for the footrest plate.

FIG. 5 is a bottom view of the footrest plate per se taken in the direction of arrow 5 in FIG. 3.

DETAILED DESCRIPTION OF THE PREFERRED EMBODIMENTS

Turning now descriptively to the drawings, in which similar reference characters denote similar elements throughout the several views, FIGS. 1 through 4 illustrate an improved pitchfork 10 which consists of a fork head 12 with a ferrule 14 extending from an upper end 16 of the fork head 12. An elongated handle 18 has a first end engaging the ferrule 14. A hand grip 20 engages a second end of the elongated handle 18. A structure 22 on the upper end 16 of the fork head 12 is for increasing a support area for a foot of a person, to facilitate a better insertion of the fork head 12 into the soil and other material which it is desired to handle.

In FIGS. 1 and 2, the support area increasing structure 22 is a pair of extension footrests 24, each affixed onto the upper end 16 of the fork head 12 on opposite sides of the ferrule 14.

In FIGS. 3, 4 and 5, the support area increasing structure 22 is a two position footrest plate 26 placed upon the upper end 16 of the fork head 12 over the ferrule 14.

The footrest plate 26 is a rectangular shaped panel 28 having a central aperture 30. A pair of long slots 32 extend from the underside 34 of the panel between the central aperture 30 and short sides 36 of the panel 28. A pair of short slots 38 extend from the underside 34 of the panel 28 between the central aperture 30 and long sides 40 of the panel 28. The long slots 32 of the panel 28 can be placed on the upper end 16 of the fork head 12 with the panel 28 being in a first longitudinal position, in which the opposite short sides 36 will overhang the sides of the fork head 12. The short slots 38 of the panel 28 can be placed on the upper end 16 of the fork head 12 with the panel 28 being in a second transverse position in which the opposite short sides 36 will overhang the front and back of the fork head 12, to give better leverage to the foot of the person in either position.

OPERATION OF THE INVENTION

To use the first embodiment of the improved pitchfork 10, a person simply places either foot onto either extension footrest 24, so that the fork head 12 can be better inserted into the soil.

To use the second embodiment of the improved pitchfork 10, a person places the rectangular shaped panel 28 of the footrest plate 26 in either the first longitudinal position or in the second transverse position. When the foot of the person engages the footrest plate 26, the foot will be able to provide better leverage to manipulate the fork head 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved pitchfork which comprises:
   a) a fork head with an upper end, sides and a front and back;
   b) a ferrule extending from an upper end of said fork head;
   c) an elongated handle having a first end engaging said ferrule;
   d) a hand grip engaging a second end of said elongated handle and
   e) means on said upper end of said fork head for increasing a support area for a foot of a person, to facilitate a better insertion of said fork head into the soil and other material which it is desired to handle; wherein said support area increasing means is a two position footrest plate placed upon said upper end of said fork head over said ferrule; wherein said footrest plate includes a rectangular shaped panel having opposite short sides, a central aperture, a pair of long slots extending from the underside of said panel between said central aperture and said short sides of said panel and a pair of short slots extending from the underside of said panel between said central aperture and long sides of said panel, so that said long slots of said panel can be placed on said upper end of said fork head with said panel being in a first longitudinal position, in which said opposite short sides will overhang said sides of said fork head or said short slots of said panel can be placed on said upper end of said fork head with said panel being in a second transverse position in which said opposite short sides will overhang the front and back of said fork head to give better leverage to the foot of the person in either position.

* * * * *